US005301975A

United States Patent [19]

Rivera

[11] Patent Number: 5,301,975

[45] Date of Patent: Apr. 12, 1994

[54] OVERHEAD SCREEN FOR A WHEELCHAIR

[76] Inventor: Eddy Rivera, 9619 Artesia Blvd., Bellflower, Calif. 90706

[21] Appl. No.: 804,977

[22] Filed: Dec. 11, 1991

[51] Int. Cl.[5] ........................ B62J 17/08; E04H 15/06

[52] U.S. Cl. .............................. 280/304.1; 280/250.1; 280/647; 297/184.15; 297/DIG. 4; 135/88

[58] Field of Search ..................... 280/250.1, 647, 642, 280/649, 650, 657, 658, 304.1, 32.5, 643, 644, 648, 293; 296/78.1; 297/DIG. 4, 184; 135/96, 88, 106, 117

[56] References Cited

U.S. PATENT DOCUMENTS

| | | | |
|---|---|---|---|
| 3,497,259 | 2/1970 | Sherfey | 297/DIG. 4 X |
| 3,561,787 | 2/1971 | Toda | 280/642 |
| 3,674,310 | 7/1972 | Montagano | 297/DIG. 4 X |
| 3,697,127 | 10/1972 | Robertson | 297/DIG. 4 X |
| 4,093,305 | 6/1978 | Staroste et al. | 297/184 |
| 4,378,946 | 4/1983 | Voytko et al. | 280/642 |
| 4,389,057 | 6/1983 | Richard, Jr. | 280/304.1 |
| 5,168,889 | 12/1992 | Diestel | 135/88 |
| 5,188,380 | 2/1993 | Tucek | 135/88 X |

FOREIGN PATENT DOCUMENTS

| | | | |
|---|---|---|---|
| 3414204 | 10/1985 | Fed. Rep. of Germany | 280/250.1 |
| 2168018 | 6/1986 | United Kingdom | 280/304.1 |

*Primary Examiner*—David M. Mitchell
*Assistant Examiner*—Florian Zeender
*Attorney, Agent, or Firm*—Charles H. Thomas

[57] ABSTRACT

An overhead screen is provided for mounting above a wheelchair. The screen has an opaque canopy that protects the wheelchair occupant from direct sunshine as well as precipitation. The canopy is held in an extended position out over the wheelchair seat by a screen framework. The framework is releasably connected to the wheelchair by means of coupling elements, which may the form of elbows that fit telescopically over the rearwardly extending handles at the back of the wheelchair which are normally provided for the purpose of allowing a companion of the wheelchair occupant to push the wheelchair.

2 Claims, 3 Drawing Sheets

OVERHEAD SCREEN FOR A WHEELCHAIR

BACKGROUND OF THE INVENTION

1. Field of the Invention

The present invention is an overhead screen for a wheelchair to protect the wheelchair occupant from the sun as well as precipitation.

2. Description of the Prior Art

A considerable number of people find themselves in circumstances where it is necessary to use wheelchairs in order to achieve a certain level of mobility to overcome physical handicaps or disabilities. Paraplegics and other disabled or infirm people find it necessary, or at least more comfortable, to move about in wheelchairs as part of their daily routines. While considerable recent attention has been directed toward providing wheelchair occupants with access to public places and other facilities, less attention has been directed toward improving the level of comfort and protection of wheelchair occupants in their wheelchairs.

A typical wheelchair is constructed of a frame formed of hollow, tubular metal members supported by wheels. The wheelchair frame has laterally spaced supports which define a seating area equipped with either a cushion or sling type seat. The wheelchair frame also defines a pair of armrests above and on either side of the wheelchair seat. A pair of large wheels are disposed on both sides of the frame adjacent the seating area. These wheels are equipped with tires and hand wheels by means of which the occupant can propel the wheelchair. Beneath the front of the seating area the wheelchair frame carries a pair of smaller wheels, typically mounted on swivels so as to provide the occupant with stability and a tight turning radius. A pair of footrests are normally provided immediately in front of the smaller wheels.

The wheelchair frame also has a pair of upright members which extend upwardly on both sides at the rear of the seating area. Either a cushion type or sling type back normally extends between these upright members to provide the occupant with a backrest. The upright members defining the backrest support normally terminate in end extremities that are portions of metal tubing which are bent rearwardly parallel to each other and parallel to the ore and aft alignment of the wheelchair generally. These end extremities at the back of the wheelchair serve as a pair of handles which are useful for someone other than the occupant to push the wheelchair.

While there is a general awareness of the restricted degree of mobility that wheelchair occupants have, there are certain other disadvantages and discomforts which wheelchair occupants must endure. In part because of the limited amount of physical activity in which wheelchair occupants are able to engage, such persons are particularly sensitive to the effects of direct and prolonged sunlight. For example, while wheelchair occupants enjoy watching spectator sports performed out of doors just as much if not more than other people who are not confined to wheelchairs, they tend to suffer more from prolonged exposure to the sun than do other people due to skin sensitivity.

Moreover, persons confined to wheelchairs are often exposed to more direct sunlight than others, since the areas accessible to wheelchairs at outdoor sporting events or concerts are normally located at the lowermost levels of a stadium or in the area immediately surrounding a playing field or stage. These areas are typically provided with the least amount of shade and protection from precipitation, since any such protection in stadiums or bleachers is normally greatest at the uppermost and rearmost seating areas. Therefore, not only are wheelchair occupants generally more sensitive to solar radiation, but they are often subjected to a greater amount of solar radiation than the general population at any given outdoor event. Wheelchair occupants are likewise provided with the least protection from precipitation for the same reason.

SUMMARY OF THE INVENTION

A primary object of the present invention is to provide wheelchair occupants with protection from solar radiation. Specifically, the invention is an overhead screen adapted for mounting above a wheelchair. The screen has a framework for supporting a canopy above the wheelchair seat and a coupling means for releasably connecting the screen framework to the wheelchair frame. The canopy protects the wheelchair occupant from the adverse effects of the ultraviolet rays in solar radiation, as well as from precipitation, both in the form of rain and snow.

Another object of the invention is to provide a wheelchair occupant with a portable, protective screen which may be readily attached to or detached from a wheelchair. While the overhead screen of the invention is highly desireable for use by a wheelchair occupant located out of doors who would otherwise be exposed to direct sunlight or precipitation, it is extremely advantageous for the overhead screen to be readily removable from the wheelchair. The feature of removability of the screen is important to prevent the overhead screen from blocking the view of others seated or standing behind the wheelchair in an enclosed structure, such as a theater or auditorium. Also, it is important for the screen of the invention to be readily removable from the wheelchair so that the wheelchair may be easily collapsed and transported in a vehicle.

A further object of the invention is to provide an overhead screen which can be mounted for use without any special modification to an otherwise conventional wheelchair. This versatility of use with virtually any conventional wheelchair is achieved by providing the overhead screen of the invention with coupling means in the form of hollow, tubular members which extend from the screen framework parallel to each other below the canopy. These tubular members are engageable with the handles found at the backs of nearly all wheelchairs. The tubular members are removably connected to thee handles preferably in sliding, telescopic engagement therewith. That is, the tubular coupling members of the overhead screen of the invention may be constructed to slide telescopically either onto or into the hollow handles that extend rearwardly from the upright posts at the back of nearly all wheelchairs.

A further object of the invention is to provide an overhead screen for a wheelchair which is readily collapsible. The feature of collapsibility allows the overhead screen to be transported easily in an automotive vehicle and to be carried on the wheelchair itself in a collapsed condition without being unduly cumbersome.

In one broad aspect the present invention may be considered to be an overhead shield or screen for a wheelchair that has a chair frame and a seat. The screen or shield of the invention is comprised of a canopy, a framework for supporting the canopy, and coupling means for releasably joining the canopy framework to the chair frame so that the canopy framework supports the canopy above the seat. The wheelchair frame typically includes a pair of handles for pushing and the coupling means of the shield or screen of the invention is releasably connected to these handles.

In another broad aspect the invention may be considered to be an improvement in a wheelchair having a chair frame and a seat. The improvement of the invention is comprised of an overhead screen removably mounted on the chair frame and having a canopy adapted for disposition above the seat. The screen canopy is preferably formed of a flexible material and the screen framework is preferably comprised of a plurality of rigid elements which are collapsible together so that the canopy may be moved between folded and extended positions. With the canopy in its extended position the screen may be mounted on the wheelchair frame with the canopy projecting forwardly from the back of the wheelchair out over the wheelchair seat. When the screen framework is collapsed the screen may be transported compactly within an automotive vehicle.

The invention may be described with greater clarity and particularity by reference to the accompanying drawings.

DESCRIPTION OF THE DRAWINGS

FIG. 1 is a rear elevational view showing the wheelchair screen of the invention mounted on a wheelchair.

DESCRIPTION OF THE EMBODIMENT

Figure 1:
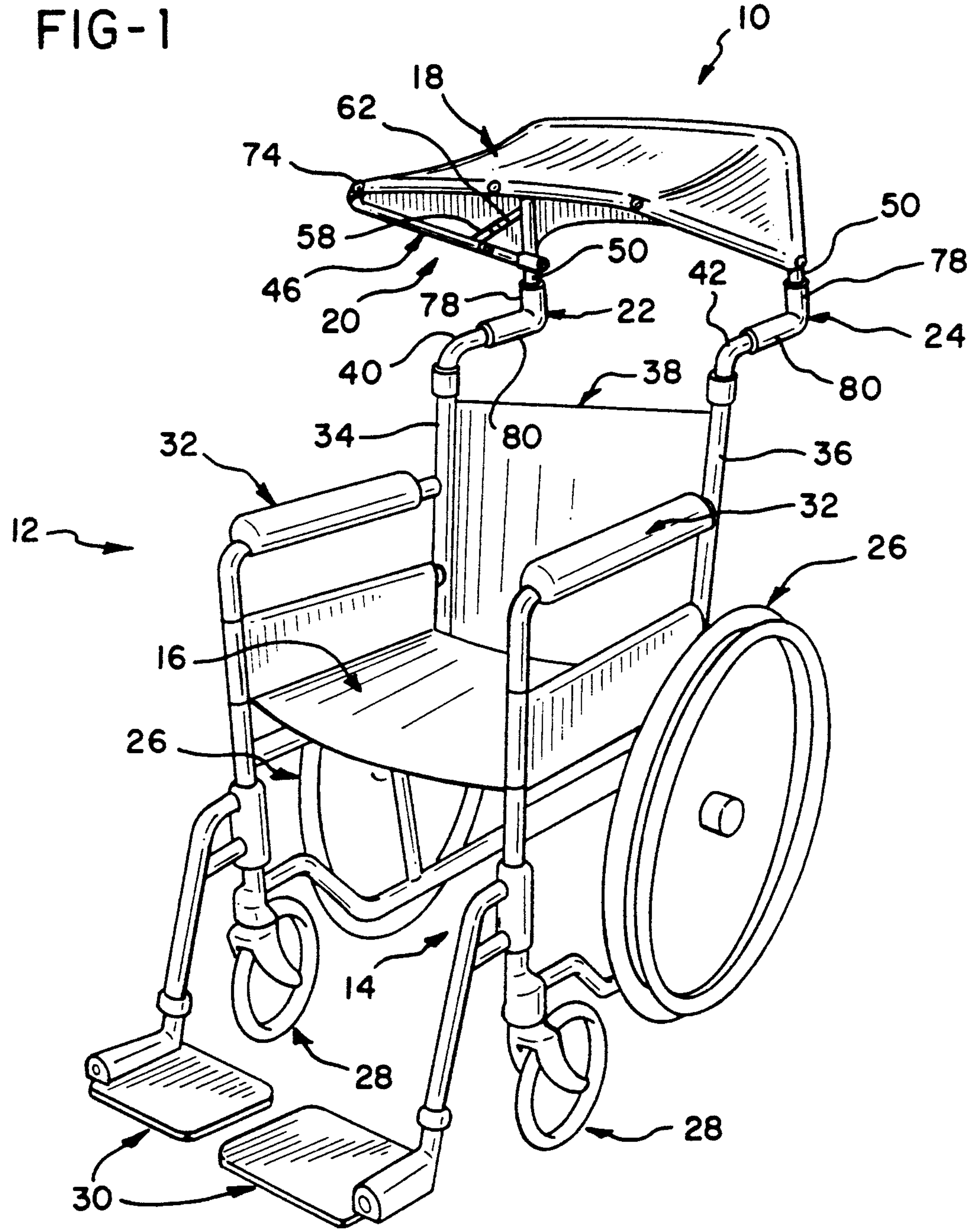
FIG. 1 is an elevational view of an overhead screen according to the invention mounted on an otherwise conventional wheelchair.

FIG. 1 illustrates an overhead screen 10 adapted for mounting above a wheelchair which is indicated generally at 12. The wheelchair 12 has a frame 14 which supports a seat 16. The overhead screen 10 is comprised of a canopy 18, a screen framework 20 for supporting the canopy 18 above the wheelchair seat 16, and coupling means in the form of hollow, tubular elbows 22 and 24 for releasably connecting the screen framework 20 to the wheelchair frame 14.

The wheelchair 12 has a pair of large wheels 26 and smaller wheels 28 on opposite sides of the seat 16. The frame 14 also carries a pair of footrests 30 forwardly of the wheels 28. The frame 14 defines a pair of armrests 32 above and on opposite sides of the seat 16, and a pair of upright supporting post members 34 and 36 on opposite sides of a wheelchair back 38. The posts 34 and 36 extend upright at an inclination and have end extremities 40 and 42, respectively, which extend generally horizontally and mutually parallel to each other and rearwardly, relative to the wheel chair seat 16. The end extremities 40 and 42 serve as handles for pushing the wheelchair 12. The upright posts 34 and 36 on either side of the wheelchair back 38, and their rearwardly extending extremities 40 and 42 are normally formed of tubular, stainless steel stock, typically between about three quarters of an inch and one inch in diameter.

Figure 5:
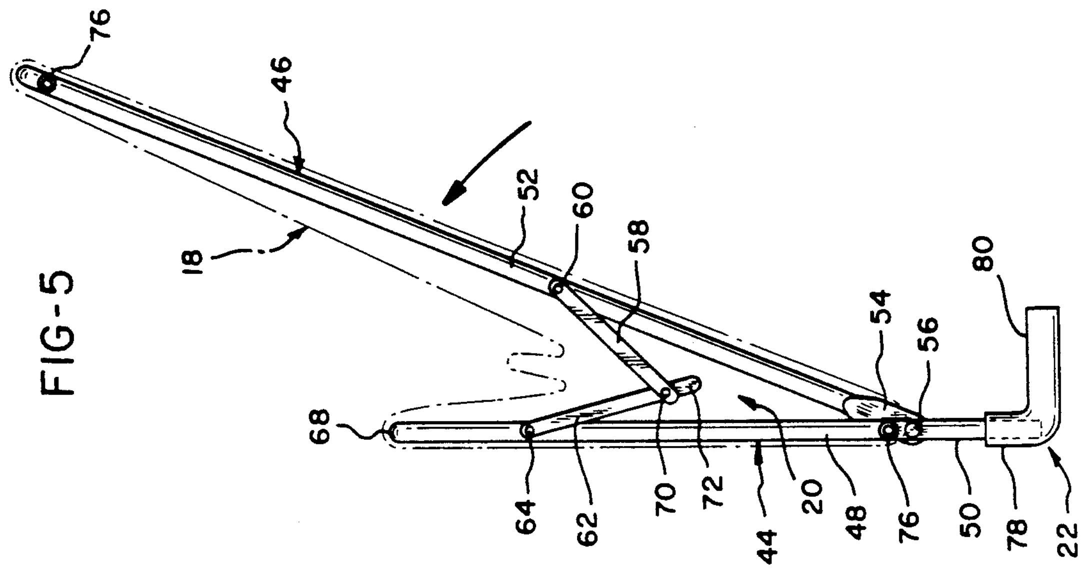
FIG. 5 is a side elevational view showing the rigid frame elements being moved into a collapsed condition, with the screen canopy shown in phantom.
Figure 4:
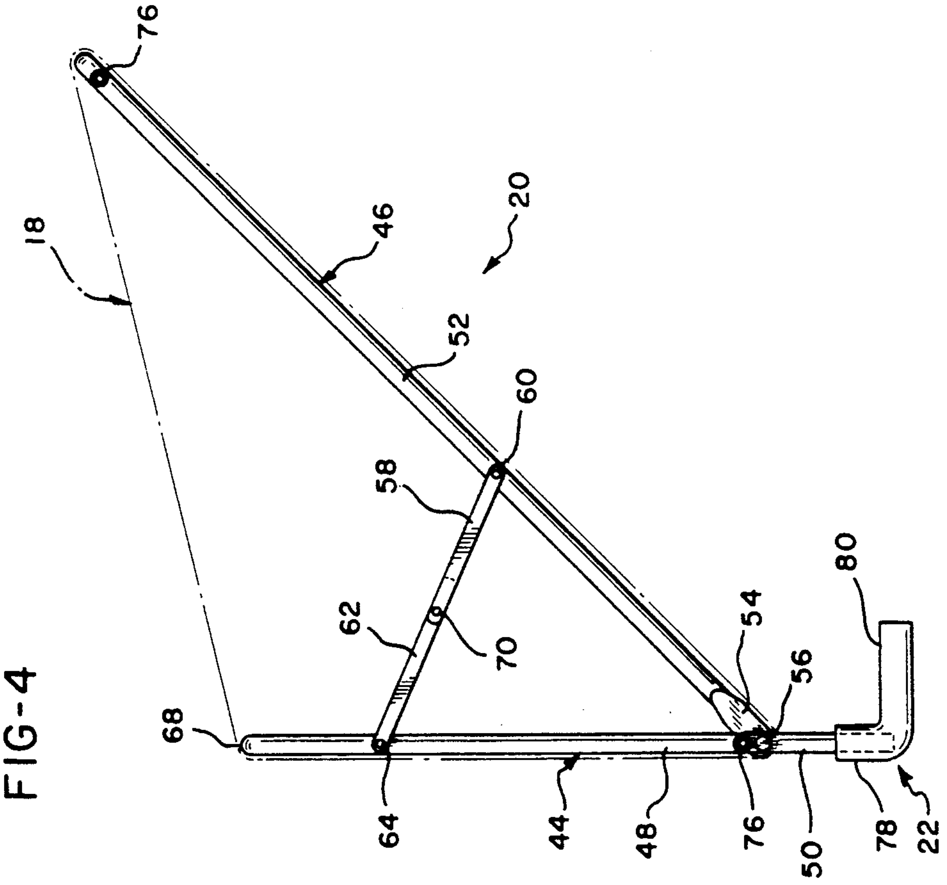
FIG. 4 is a side elevational view illustrating the screen framework with rigid elements thereof shown in an extended position and with the screen canopy shown in phantom.

The framework 20 of the screen 10 is comprised of a pair of rigid, U-shaped members 44 and 46, best illustrated in isolation in FIGS. 4 and 5. The U-shaped member 44 is formed of a single length of hollow, tubular, stainless steel, bent into a U-shaped configuration to define a pair of legs 48 with end extremities 50. The end extremities 50 of the first screen framework member 44 fit telescopically into and are permanently secured within the upright ends 78 of the coupling elbows 22 and 24, as illustrated in FIG. 1. The second rigid screen framework member 46 is also formed of a single length of tubular stainless steel, bent into a U-shaped configuration and having a pair of legs 52 with end extremities 54. The end extremities 54 are flattened and are hinged to the legs 48 of the first U-shaped member 44 at intermediate locations therealong by means of bolts 56 and nuts 58.

The legs 52 of the second rigid U-shaped frame member 46 have a pair of cross link members 58 hingedly connected thereto by means of bolts 60 at intermediate locations therealong. Corresponding cross link members 62 are hingedly connected to the legs 48 of the first U-shaped member 44 by means of bolts 64 proximate the top bar 68 that extends laterally across the width of the wheelchair 12. The links 62 and 58 are hingedly coupled together in pairs by rivets 70. Each link 62 includes a detent protrusion 72 at its end extremity on the side facing the link 58. The detent protrusion 72 fits into a corresponding detent recess (not visible) in the facing surface of the link 58 in the manner of a conventional detent.

As illustrated in FIGS. 4 and 5, the screen framework 20 is collapsible. The rigid U-shaped screen frame member 46 can be moved to the extended position of FIG. 4 to hold the canopy stretched out over the wheelchair seat 16. Alternatively, the detent protrusion 72 can be dislodged from the corresponding detent recess in the link 58, so that the U-shaped screen framework member 46 can be folded toward the frame member 44 as depicted in FIG. 5. The frame members 44 and 46 can thereby be moved from an extended position, in which they reside at an angle of about forty five degrees relative to each other as depicted in FIG. 4, to a collapsed position as shown in FIG. 5. In the collapsed position the first and second frame members 44 and 46 reside at an angle of about fifteen to twenty degrees relative to each other.

The screen canopy 18 is constructed of a flexible, opaque, waterproof material, such as vinyl plastic or canvas. The canopy 18 may be secured to the framework 20 in any conventional manner, such as by metal snaps 74 along the edges of the canopy 18 which frictionally engage with corresponding snap members 76 on the screen frame members 44 and 46. The canopy 18 thereby moves with the rigid members 44 and 46 of the screen framework 20 between extended and folded positions as is depicted, respectively, in FIGS. 4 and 5. Movement of the frame members 44 and 46 between the collapsed position of FIG. 5 and the extended position of FIG. 4 thereby alternatively collapses and extends the canopy 18.

Figure 2:
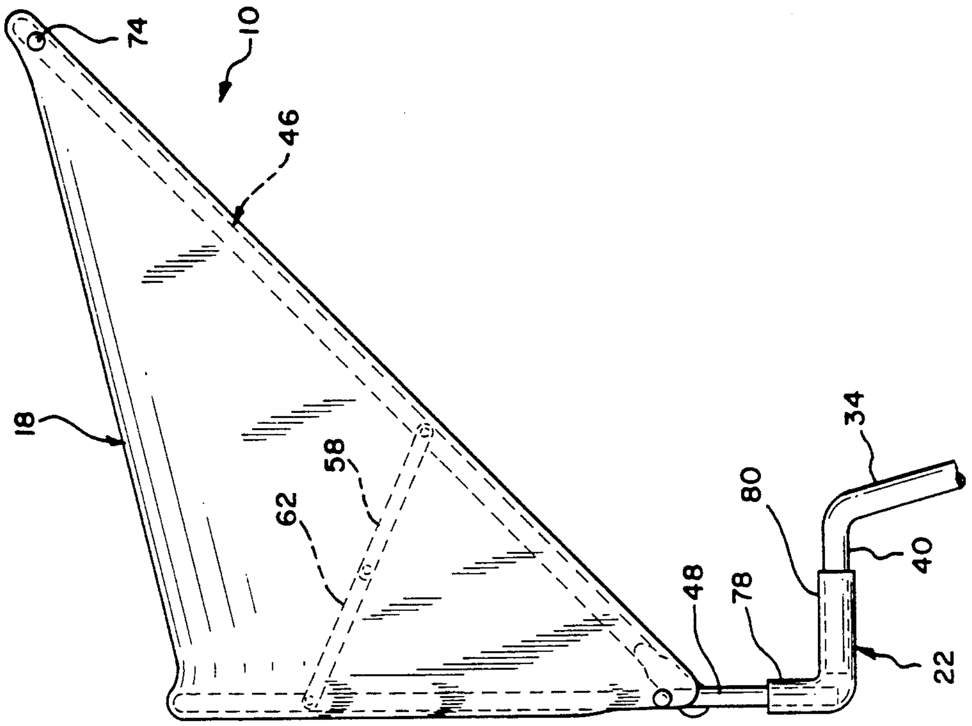
FIG. 2 is a side elevational view showing the manner in which the overhead wheelchair screen of the invention is mounted on the wheelchair of FIG. 1.
Figure 3:
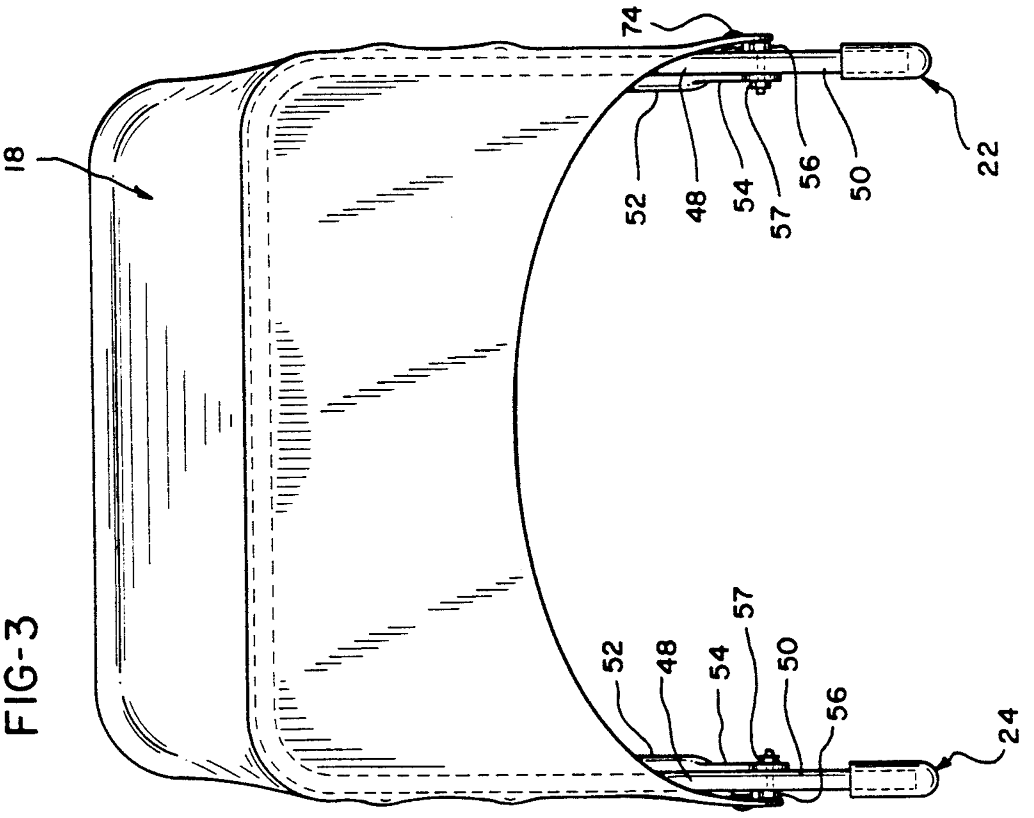

As illustrated in FIGS. 2 and 3, the legs 48 of the first U-shaped screen framework member 44 serve as upright posts for supporting the canopy 18 at a level elevated over the wheelchair seat 16, as shown in FIG. 1.

The coupling elbows 22 and 24 are preferably comprised of hollow, tubular plastic members which may, for example, be formed of polyvinyl chloride pipe. The elbows 22 and 24 each include an upwardly extending hollow leg 78 and a forwardly extending hollow tubular leg 80. The legs 78 and 80 are oriented at right angles to each other.

The upwardly extending elbow legs 78 receive the lower extremities 50 of the first rigid screen frame member 44 in sliding, telescopic engagement therewithin. Similarly, the forwardly extending legs 80 of the coupling elbows 22 and 24 extend parallel to each other below the canopy 18 and are engageable over the handles 40 and 42 of the wheelchair 12 in sliding, telescopic engagement therewith, as best shown in FIG. 2. The coupling elbows 22 and 24 are thereby connected to the upright supporting members 34 and 36 at the back of the wheelchair 12 by releasable engagement with the handles 40 and 42 at the rear extremities of the upright posts 34 and 36.

With the coupling elbows 22 and 24 engaged on the handles 40 and 42, respectively, the screen or shield 10 is held in an erected position with the canopy 18 residing directly above the wheelchair seat 16. The canopy 18 thereby protects the wheelchair occupant from direct sunshine and also from precipitation. The use of the overhead screen 10 does not interfere with the ability of a companion to push the wheelchair 12, since another person can easily grasp the upright legs 78 of the coupling elbows 22 and 24 with both hands and readily push and maneuver the wheelchair 12.

The overhead screen 10 is readily detachable and removable from the wheelchair 12. To remove the overhead screen 10, one merely pulls rearwardly on the coupling elbows 22 and 24, to slide the legs 80 thereof off of the rearwardly extending handles 40 and 42 of the wheelchair frame. The detents 72 can then be disengaged from their corresponding recesses, and the entire screen 10 can be folded as illustrated in FIG. 5. This facilitates the transport of both the wheelchair 12 and the collapsible screen 10.

If desired, the screen 10 can be hung from the rear of the wheelchair 12 while in the collapsed position as a means of storing or carrying it on the wheelchair 12. To accomplish this, the coupling elbows 22 and 24 are slidably disengaged from the handles 40 and 42 in the manner previously described. The screen 10 is then collapsed as previously described and turned upside down. The forwardly projecting leg 80 of the coupling elbow 24 can then be pushed onto the rearwardly extending handle 40, while the projecting leg 80 of the other coupling elbow 22 is concurrently pushed onto the handle 42.

Undoubtedly, numerous variations and modifications of the invention will become readily apparent to those familiar with wheelchairs and wheelchair accessories. For example, the overhead screen of the invention does not necessarily need to be connected to the handles used to push the wheelchair, but could be mounted elsewhere on the framework. Accordingly, the scope of the invention should not be construed as limited to this specific embodiment of the invention depicted and described, but rather is defined in the claims appended hereto.

I claim:

1. An overhead screen adapted for mounting above a wheelchair and removable therefrom, said wheelchair having a back, a frame including a pair of upright supporting members on opposite sides of said back formed in a tubular configuration and having upper end extremities which extend mutually parallel to each other and horizontally rearwardly to serve as handles for pushing said wheelchair, and a seat supported by said frame, comprising a canopy formed of a flexible material, a screen framework including a first U-shaped member attached to said canopy and having a pair of upright legs with end extremities forming upright posts for supporting said canopy at an elevated level above said wheelchair seat and above said handles, coupling means formed of hollow, tubular elbows having horizontally disposed legs engageable with said handles of said wheelchair in sliding, telescopic engagement therewith and having vertically disposed legs extending upwardly to engage said upright posts, a second U-shaped member attached to said canopy and having legs with end extremities hinged to said upright legs of said first U-shaped member at intermediate locations therealong, two first cross link members hinged to said legs of said first U-shaped member and two second cross link members hinged to said legs of said second U-shaped member and to said first cross link members, detent means on said cross link members which are releasable to allow said cross link members to fold together, whereby said U-shaped members are collapsible together, and said detent means are alternatively engageable when said first cross link members are linearly aligned with said second cross link members to hold said canopy extended out over said seat.

2. In a wheelchair having a back, a chair frame including a pair of upright supporting members on opposite sides of said back which are of a tubular configuration and which have upper end extremities that extend mutually parallel to each other horizontally rearwardly to serve as handles for pushing said wheelchair, and a seat supported by said frame, the improvement comprising a removable screen having a canopy formed of a flexible material, a screen framework including a first U-shaped member having legs forming upright posts for supporting said canopy at an elevated level above said wheelchair seat and above said handles, coupling means comprised of hollow, tubular elbows having horizontally disposed legs extending parallel to each other below said canopy and engageable with said handles of said wheelchair in sliding telescopic engagement therewith, and vertically disposed legs extending upwardly to engage said upright posts for releasably connecting said screen framework to said chair frame, a second U-shaped member having a pair of legs with end extremities that are hinged to said legs of said first U-shaped member at intermediate locations therealong, and two pairs of hinged cross link members each pair joining a separate one of said legs of said first U-shaped member to a separate one of said legs of said second U-shaped member, each pair of cross link members being foldable together and having detent means therebetween, whereby said detent means are disenegageable to allow said first and second U-shaped members to rotate toward each other, thereby collapsing said first and second U-shaped members together, and said pairs of said cross link members are alternatively extendable into linear alignment with each other, whereupon said detent means are engaged to hold said cross link members in an extended position, whereby said second U-shaped member extends said canopy forwardly from said upright posts out over said seat.

* * * * *